United States Patent [19]

Desmazieres

[11] Patent Number: 4,665,477

[45] Date of Patent: May 12, 1987

[54] METHOD FOR ENSURING SAFE OPERATION OF A PROGRAMMABLE AUTOMATIC CONTROL DEVICE AND AUTOMATIC CONTROL DEVICE FOR CARRYING OUT THE SAID METHOD

[75] Inventor: Jean-Gabriel Desmazieres, Paris, France

[73] Assignee: Mors, France

[21] Appl. No.: 570,807

[22] Filed: Jan. 16, 1984

[30] Foreign Application Priority Data

Jan. 20, 1983 [FR] France ............................. 83 00865

[51] Int. Cl.$^4$ ............................................. G05B 19/18
[52] U.S. Cl. ..................................... 364/184; 371/68; 371/69
[58] Field of Search .................... 364/184; 371/68, 25, 371/69, 62, 21, 19, 57

[56] References Cited

U.S. PATENT DOCUMENTS

| | | | |
|---|---|---|---|
| 4,055,754 | 10/1977 | Chesley | 371/21 |
| 4,059,749 | 11/1977 | Feilchenfeld | 371/57 |
| 4,061,908 | 12/1977 | de Jonge et al. | 371/21 |
| 4,245,344 | 1/1981 | Richter | 371/68 |
| 4,304,003 | 12/1981 | Kakizawa et al. | 371/62 |
| 4,410,938 | 10/1983 | Higashiyama | 371/19 |
| 4,433,413 | 2/1984 | Fasang | 371/25 |
| 4,442,521 | 4/1984 | Inaba | 371/68 |
| 4,447,903 | 5/1984 | Sewerinson | 371/68 |
| 4,480,303 | 10/1984 | Takada et al. | 364/184 |
| 4,482,953 | 11/1984 | Burke | 371/19 |
| 4,493,078 | 1/1985 | Daniels | 371/25 |
| 4,513,417 | 4/1985 | Lamb et al. | 371/62 |

FOREIGN PATENT DOCUMENTS

| | | | |
|---|---|---|---|
| 2346772 | 10/1977 | France | 371/69 |
| 0122340 | 10/1978 | Japan | 371/69 |
| 0122539 | 9/1981 | Japan | 371/68 |
| 1375172 | 11/1974 | United Kingdom | 371/69 |
| 2072883 | 10/1981 | United Kingdom | 364/184 |
| 0579640 | 11/1977 | U.S.S.R. | 371/57 |

OTHER PUBLICATIONS

Detecting Wiring Errors; IBM Technical Disclosure Bulletin; P. Buckner et al.; vol. 5, No. 1, Jun. 1962.
A Failure Tolerant Multi-Microcomputer; G. Schmidt et al.; Process Automation 1980, pp. 77–84.

Primary Examiner—Jerry Smith
Assistant Examiner—Allen MacDonald

[57] ABSTRACT

An automatic control device consists of a signal processing unit such as a microprocessor, two buses switchable alternately, two output demultiplexers, each associated with a bus, a device for generating an output signal of the automatic control device, having two states indicative of correct operation of the automatic control device and of a failure in the operation thereof, respectively.

21 Claims, 2 Drawing Figures

METHOD FOR ENSURING SAFE OPERATION OF A PROGRAMMABLE AUTOMATIC CONTROL DEVICE AND AUTOMATIC CONTROL DEVICE FOR CARRYING OUT THE SAID METHOD

BACKGROUND OF THE INVENTION

The present invention relates to a method for ensuring safe or reliable operation of a programmable automatic control device intended to control a user device such as a machine or a plant and an automatic control device for carrying out the said method.

There are already known programmable automatic control devices which are so designed that a simple failure of any component thereof places the outputs of the automatic control device into a predetermined state. However, the known automatic control devices of this type are designed in the form of a system redundant in space, i.e., in the form of a duplicated system. They suffer from the major disadvantage of being expensive and difficult to use and to program.

The present invention has as its purpose to provide to the problem relating to the programmable automatic control devices a solution which allows fulfilling the same safety or reliability functions as the known automatic control devices, but at a lower cost.

To achieve this purpose, the present invention provides a method for ensuring safe or reliable operation of a programmable automatic control device, which is characterized in that, for a same given state of the inputs of the automatic control device, a same processing unit such as a microprocessor is caused to execute the same program successively twice by using every time another bus, and use is made as a criterion of correct operation of the automatic control device the identity of the two signals resulting from the two successive executions of the program.

SUMMARY OF THE INVENTION

According to an advantageous feature of the invention, there is produced from the two signals resulting from the two successive executions of the program a control signal for the user device, the polarity of which changes at the rate of the two signals or remains constant depending on whether the signals are identical or different, the said difference being indicative of a failure in the operation of the automatic control device.

According to another advantageous feature of the invention, the said program includes a test program portion and a user program portion.

According to the method of the invention, there is performed in the test program portion a test of the microprocessor by running a test program using all the instructions of the user program, a test of the inputs of the automatic control device including a check on the inputs which are not activated in the absence of an external signal, a test of the internal variables including a check on all such variables, preferably by reversing them twice, and an internal software for the system such as the delays-counters program.

According to another advantageous feature of the invention, provision is made, in case of defective operation of the automatic control device, for stopping the polling of its inputs, the placing of its imputs into the "O" state and, if appropriate, an alarm.

The automatic control device according to the present invention, for carrying out the said method, comprises a single processing unit such as a microprocessor, two alternately switchable buses, two demultiplexers, each associated with a bus, a device for generating an output signal of the automatic control device, having two states indicative of correct operation of the automatic control device and of defective operation thereof, respectively.

According to an advantageous feature of the invention, the generating device includes a bistable device such as a flip-flop with two inputs each connected to an output of a demultiplexer and capable of producing at its output an a.c. or a d.c. signal depending on whether the output signals applied successively to their inputs are of the same binary state or different from one another.

According to another feature of the invention, the program storage is divided into two zones, i.e., a test zone and a user zone.

According to still another advantageous feature of the invention, the automatic control device includes a preferably wired decoder for calibrating the processing unit, which is connected to the test outputs of this unit.

According to the present invention, the input multiplexer device may be provided with alternately polled double inputs or simple inputs which are adapted to be supplied with power by the outputs of the automatic control device.

According to an advantageous feature of the invention, the data storage device includes two data storages used alternately.

It is also advantageous to use in the device for generating the output signal of the automatic control device a transformer whose primary winding is connected to the two-input bistable device, the said transformer producing at the output of its secondary winding a "O." state when the two input signals of the bistable device are different from one another.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
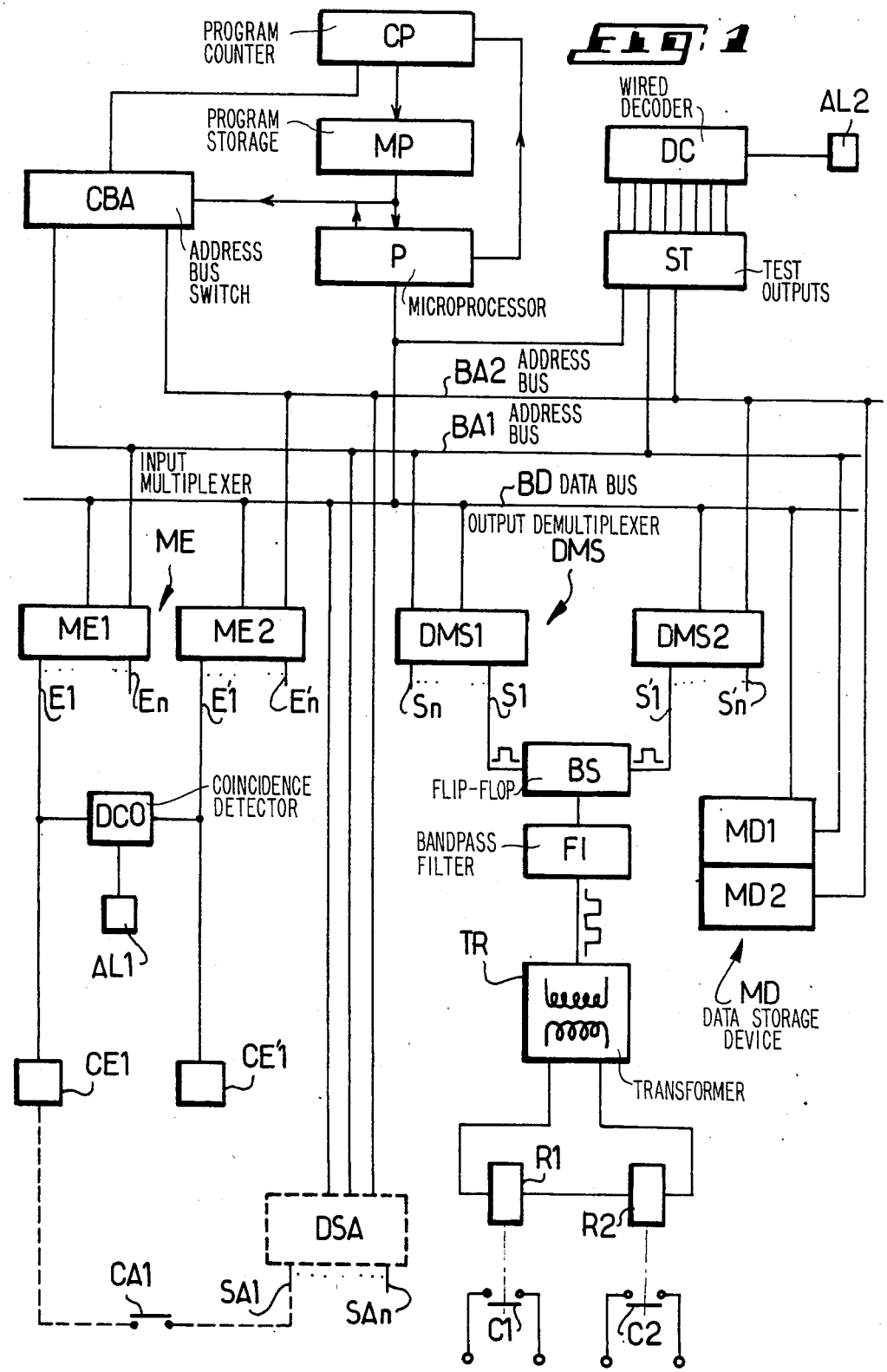
FIG. 1 is a block diagram of an embodiment of the safety automatic control device of the invention.

FIG. 1 shows by way of example a programmable automatic control device according to the present invention, which comprises essentially a processing unit consisting of a microprocessor P with which are associated, as shown, a program storage MP, a program counter CP, two address buses BA1 and BA2, a data bus BD, an address bus switch CBA, an input multiplexer device ME and an output demultiplexer device DMS, as well as a data storage device MD. Furthermore, the microprocessor includes a wired decoder DC connected to test outputs ST of the microprocessor, represented in the form of a separate block.

As seen in FIG. 1, the output demultiplexer device DMS includes two demultiplexers DMS1, DMS2 connected on the one hand to the data bus BD and, on the other hand, to the address buses BA1 and BA2, respectively. Each of the demultiplexers DMS1, DMS2 includes a certain number of parallel outputs designated respectively by S1 ... Sn and S1' ... Sn'. The corresponding outputs of the two demultiplexers are connected, as shown in FIG. 1 for the outputs S1, S1', to two inputs of a bistable device such as a flip-flop BS. The output of the flip-flip BS is connected through a band-pass filter FI to the primary winding of a transformer TR whose secondary winding circuit includes two relays R1,R2 which, through a contact C1,C2, respectively, ensure the closing or the opening of a circuit (not shown) for the supply of the user system with electric power.

As regards the input demultiplexer device ME, it is seen that FIG. 1 illustrates two variants of embodiment, one with double inputs illustrated in full lines and a second variant with a simple input shown in interrupted lines. In the first form of embodiment, there are provided two input multiplexers ME1,ME2 with inputs E1 ... En and E1' ... En'. As shown in FIG. 1 for the corresponding inputs E1,E1', a coincidence detector DCO is associated with each pair of inputs. The double inputs, such as the inputs E1,E1', are adapted to be polled alternately. In the second form of embodiment, the simple inputs may be supplied with power from the outputs SA1 ... SAn of an output device DSA of the microprocessor. To this end, the device DSA is connected, on the one hand, to the address buses BA1, BA2 and, on the other hand, to the data bus BD. The connection between the various outputs SA1 ... SAn and the simple inputs E1 ... En may be effected by means of a set of contacts, of which only the contact CA1 is shown.

As regards the program storage MP, it should be noted that it is divided into two zones, i.e., a TEST zone and a USER zone. As for the program counter CP, it is so arranged as to be able to address the storage MP and act upon the switch of the address buses CBA to accomplish independently of the program the switching of the buses BA1,BA2 under the action of a clock signal provided by the microprocessor P. The latter may be a microprocessor in groups of 4 bits microprogrammed for a question of speed and/or, if appropriate, a 1-bit microprocessor.

To complete the description of FIG. 1, it is seen that the block ST of test outputs of the microprocessor is connected to the address buses BA1,BA2 and to the data bus BD. A certain number of alarm-signalling devices are provided, such as the devices AL1 and AL2 associated with the coincidence device DCO and with the wired decoder DC, respectively. With each input of the multiplexer E1 ... En; E1' ... En' is associated a sensing device, of which only the sensing devices DE1 and DE1' are shown.

Figure 2:
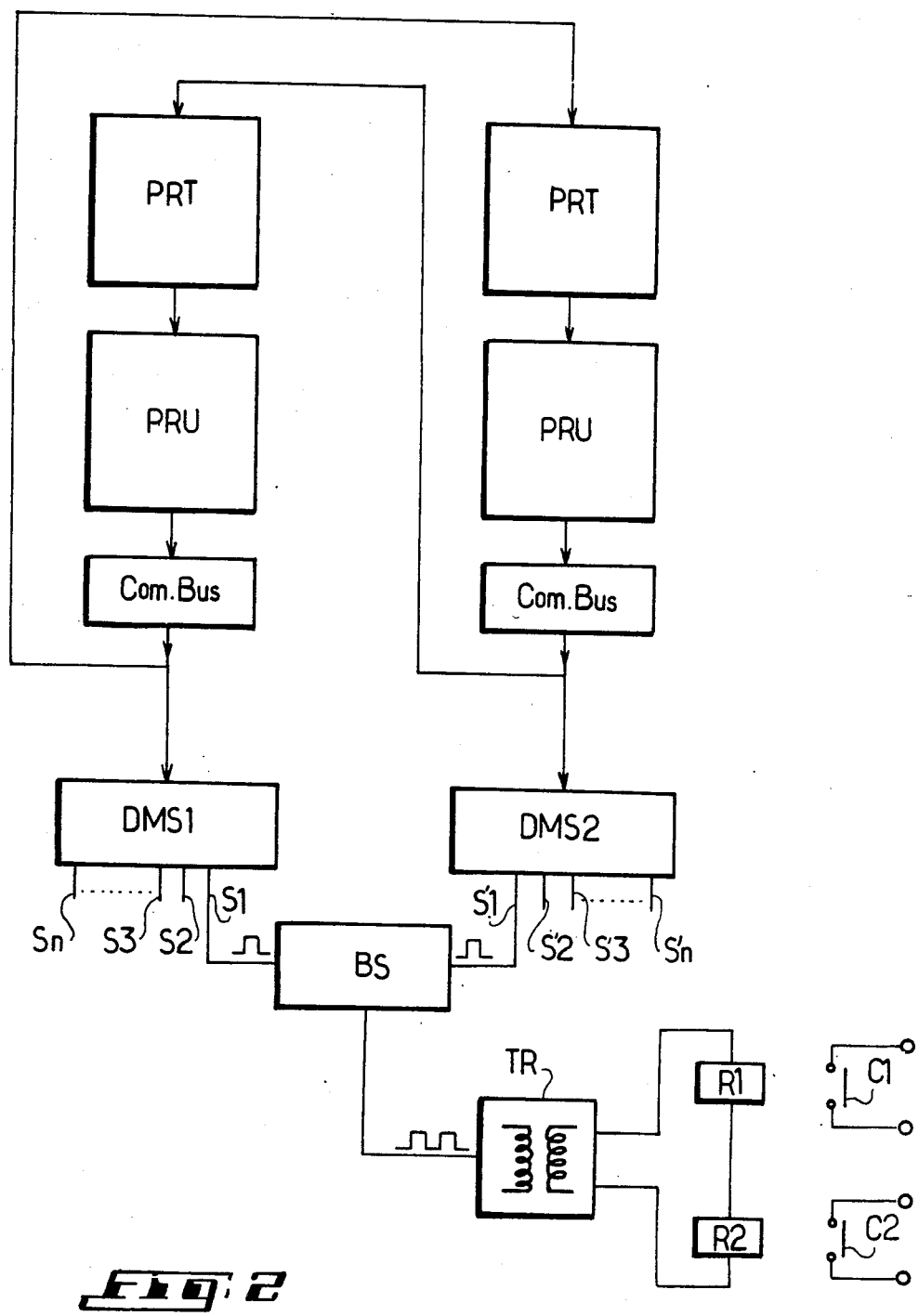
FIG. 2 is a block diagram illustrating the operating principle of the automatic control device of the invention.

The description of the automatic control device illustrated in FIG. 1 allows understanding the operating principle of a security control device according to the present invention, which is illustrated in FIG. 2.

The principal consists in executing, for a same data state of the inputs of the automatic control device, by a same processing unit, i.e., the microprocessor P, the same program twice successively by using alternately two buses, i.e., the buses BA1, BA2.

As seen in FIG. 2, the program is divided into two portions;

a user portion PRU programmed by the user of the automatic control device using the conventional language of the automatic control devices (booleangrafcet);

a test portion PRT. In this portion run in each execution of the program, i.e. in each polling of the inputs, the following tests are carried out:

a. A test of the microprocessor is performed. To this end, a typical program is run using all the instructions from the microprocessor and delivering a series of for example eight outputs (test output block ST). These outputs must assume predetermined values which are checked by a wired decoder, i.e., the decoder DC;

b. A test of the inputs is performed. It is verified that the inputs are not activated in the absence of an external signal. This external signal is applied in principal by an output SA1 ... SAn of the automatic control device;

c. A test of the internal variables is performed. All of these all checked. Preferably, they are reversed twice;

d. The internal software of the system, such as the delays-counters program, is performed.

On the first execution of the program including the TEST and USER programs PRT and PRU, after polling the input sensors CE1 ... CEn, use is made for example of the bus BA1. At the end of the first execution of the program, the automatic control device produces an output pulse which the demultiplexer DMS1 transmits to the corresponding output of the flip-flop BS and a change of bus is caused to take place by means of the program counter CP. Also placed into the zero state are the wired decoder DC and the supplies of the input sensors in case the input multiplexer ME is of the type with simple inputs. The second execution of the program or polling then starts, addressing the same inputs in the case of an input multiplexer with simple inputs or the input sensors CE1' ... CEn' in the case of double inputs. Use is now made of the bus BA2 and the output demultiplexer DMS2. At the end of this second execution of the program, the automatic control device again produces an output impulse which the demultiplexer DMS2 applies to the other input of the flip-flop BS. If this second pulse is identical with the first one, i.e. is in the same binary state, the position of the flip-flop BS is reversed. In the contrary case, i.e., if the state of the second pulse is different from that of the first pulse, the flip-flop retains its position. Consequently, if the flip-flop delivers an alternating signal at half the frequency of the executions of the program or of the pollings, the automatic control device operates correctly. This signal passes through the filter FI or directly to the transformer TR and energizes the coils of the two relays R1,R2 connected in series or in parallel in the secondary circuit of the transformer. On the other hand, any failure at one of the two chains used during the execution of the program causes the flip-flop to assume the "0" or "1" state. Under such conditions, the transformer cannot transmit power to the relays. Otherwise stated, the transformer stops the information and an alarm is produced. It is seen that the outputs of the automatic control device are then in a predetermined state.

It should also be noted that for a programmable automatic control device with 40 inputs/outputs, the running of the TEST program and of the USER program takes place every time in 5 milliseconds. The output frequency is therefore 50 fixed cycles. Owing to the execution of each program within such a short time, the successive polling for a given state of the inputs of the automatic control device is feasible without being prejudicial to the user device. The latter may be any machine or plant where the safety of the personnel and of the equipment must be ensured. By way of example, mention may be made of power plants, presses, shearing machines, transport systems or the like.

It appears from the foregoing that the automatic control device of the invention has a simple structure and is inexpensive due to the use of both a spacial redundancy and a redundancy in time, i.e., a "dynamic" redundancy. The function of the band pass filter FI is to discard any information of a frequency differing from a polling frequency or of a whole multiple thereof.

What is claimed is:

1. A method for ensuring safe and reliable operation of a programmable automatic control device adapted to control a user device, in response to signals applied to the inputs of said control device, said control device having processing means, a program storage device, data storage means, input and output interface means including multiplexers and demultiplexers and buses, said method comprising the steps of using as processing means a single processing unit which is a microprocessor, two alternately switchable address buses and one data bus, two ones of said output demultiplexers each associated with said data bus and a corresponding one of said two address buses and two of said data storage means each associated with said data bus and a corresponding one of said two address buses;

using, for the same state at the inputs of said control device, said processing means for executing a first time the program included in said program storage device by utilizing one of said address buses, one of said demultiplexers and data storage means associated therewith and for executing, after a switching operation, the same program by using the other of said address buses and the demultiplexer and data storage means associated therewith, producing, as a result of each program execution, an output signal; and using as a criterion of correct operation of said control device the identity of two signals, each resulting from one execution of the program for the same conditions as the inputs.

2. A method as claimed in claim 1, further comprising the steps of applying the two successive signals resulting from two successive executions of the same program to means adapted to produce an output signal forming the control signal for said user device, the value of said output signal changing at the rate of said two successive signals between two different values when said two signals are identical and the value of said output signal remaining constant when said two signals are different from each other, and using a constant value of said output signal as a criterion of failure of operation of said control device.

3. A method as claimed in claim 1, further comprising the step of successively executing a test program portion and a user program portion during each execution of the program.

4. A method as claimed in claim 3, further comprising the step of performing a test of said processing unit during each execution of said test program by running a test program using all the instructions of said user portion of said program.

5. A method as claimed in claim 3, further comprising the step of verifying, during execution of said test program portion, that the inputs of said control device are not activated by the absence of an external signal at said inputs.

6. A programmable automatic control device having processing means, program storage means and data storage means connected to said processing means, input and output interfaces including multiplexer means having a plurality of inputs each adapted to receive an input signal for said control device, demultiplexer means having a plurality of outputs each providing an output signal for a user device in response to one of said input signals, and bus means, said programmable automatic control device comprising said processing means comprising a single processing unit which is a microprocessor, said bus means comprising two alternately switchable address buses, one data bus, address bus switch means controlled by the program of said programmable automatic control device, said demultiplexer means comprising two output demultiplexers each associated with one of said address buses having a plurality of outputs, each of said output demultiplexers providing at one of its outputs an output signal in response to one of the input signals of said programmable automatic control device, and generating means for generating an output signal of said automatic control device in response to the reception of the two demultiplexer output signals responsive to the same input signals, said generating means being adapted to produce output signals having two states indicative of the proper operation of said automatic control device and of a failure of operation thereof, respectively.

7. An automatic control device as claimed in claim 6, wherein said generating means comprises, for each pair of demultiplexer outputs responsive to one of the inputs of said control device, a bistable device having two inputs, each connected to one output of said pair of outputs of said demultiplexer and adapted to produce at its output an a.c. signal or a d.c. signal according to whether the output of signals of said demultiplexer applied to its inputs are of the same binary state or different from each other.

8. An automatic control device as claimed in claim 7, wherein said generating means comprises transformers each having a primary winding coupled to the output of one of said bistable devices, each of said transformers having a secondary winding and producing at the output of its secondary winding a "0" state when the two input signals of said bistable devices are different from each other.

9. An automatic control device as claimed in claim 8, further comprising a bandpass filter between each bistable device and each transformer transmitting only signals at the polling frequency or at whole multiples thereof.

10. An automatic control device as claimed in claim 6, further comprising a program counter adapted to address said program storage means and to control said address bus switch means for switching over said address buses from each other.

11. An automatic control device as claimed in claim 6, wherein the program stored in said program storage means is divided into two portions consisting of a test portion and a user portion.

12. An automatic control device as claimed in claim 6, wherein said processing unit includes test outputs and a wired decoder connected to said test outputs of said processing unit for calibrating said processing unit.

13. An automatic control device as claimed in claim 6, further comprising a pair of input sensors, and wherein said multiplexer means comprises two multiplexers each associated with a corresponding one of said address buses and having a plurality of inputs, one input of one of said multiplexers forming a double input with one input of the other of said multiplexers, each of the inputs of said double input being connected to a corresponding one of said input sensors adapted to receive the same value to be sensed, each of the inputs of said double input being alternately polled at the switching rate of said address buses.

14. An automatic control device as claimed in claim 13, further comprising coincidence detectors each associated with a corresponding pair of said inputs of said double inputs.

15. An automatic control device as claimed in claim 6, further comprising supply outputs, and wherein said multiplexer means consists of a device having a plurality of simple inputs adapted to be supplied with power by said supply outputs.

16. An automatic control device as claimed in claim 6, wherein said data storage means includes two data storage device portions used alternately, each associated with a corresponding one of said two address buses.

17. A method as claimed in claim 6, wherein the execution of each of said test portions and said user portions occurs within 5 milliseconds.

18. An automatic control device as claimed in claim 6, wherein said generating means is adapted to produce an output signal "0" in case of failure of operation of said automatic control device.

19. A method for ensuring safe and reliable operation of a programmable automatic control device adapted to control a user device, in response to signals applied to the inputs of said control device, said control device having a microprocessor, a program storage device, data storage means, input and output interface means including multiplexers and demultiplexers and buses, said method comprising the steps of using as processing means a single processing unit which is a microprocessor, two alternately switchable ones of said buses, two output ones of said demultiplexers each associated with a corresponding one of said two buses and two of said data storage means each associated with a corresponding one of said buses;

using, for the same state at the inputs of said control device, said processing means for executing a first time the program included in said program storage device by utilizing one of said buses, one of said demultiplexers and data storage means associated therewith and for executing, after a switching operation, the same program by using the other of said buses and the demultiplexer and data storage means associated therewith, producing, as a result of each program execution, an output signal;

using as a criterion of correct operation of said control device the identity of the two signals, each resulting from one execution of the program for the same conditions as the inputs;

successively executing a test program portion and a user program portion during each execution of the program; and checking and reversing all internal variables twice, during the running of the test portion of said program, in order to detect whether the values of said variables change when they are reversed.

20. A method as claimed in claim 19, further comprising the step of verifying delays by counting the clock cycles via a program using the tested internal variables.

21. A method as claimed in claim 19, further comprising the step of stopping the polling of the inputs of said control device, placing the outputs of said control device in a zero state and producing an alarm signal in the event of malfunction of said control device.

* * * * *